United States Patent
Fitzgibbon et al.

(10) Patent No.: US 8,648,695 B2
(45) Date of Patent: *Feb. 11, 2014

(54) APPARATUS AND METHOD FOR OPERATING DEVICES BASED UPON VEHICLE DETECTION FOR USE WITH A MOVABLE BARRIER

(71) Applicant: The Chamberlain Group, Inc., Elmhurst, IL (US)

(72) Inventors: James J. Fitzgibbon, Batavia, IL (US); Jeremy E. Jenkins, Bartlett, IL (US)

(73) Assignee: The Chamberlain Group, Inc., Elmhurst, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/758,709

(22) Filed: Feb. 4, 2013

(65) Prior Publication Data
US 2013/0147601 A1 Jun. 13, 2013

Related U.S. Application Data

(63) Continuation of application No. 12/703,530, filed on Feb. 10, 2010, now Pat. No. 8,368,509.

(51) Int. Cl.
G08B 21/00 (2006.01)
(52) U.S. Cl.
USPC .............................. 340/5.71; 340/541; 49/13
(58) Field of Classification Search
USPC .............. 340/539.1, 541, 5.7, 5.71; 49/13–26
See application file for complete search history.

(56) References Cited

U.S. PATENT DOCUMENTS

| | | | |
|---|---|---|---|
| 5,499,887 A | 3/1996 | Verra | |
| 5,751,224 A | 5/1998 | Fitzgibbon | |
| 6,154,544 A | 11/2000 | Farris et al. | |
| 6,742,303 B2 | 6/2004 | Pedemonte | |
| 6,810,123 B2 | 10/2004 | Farris et al. | |
| 7,057,494 B2 | 6/2006 | Fitzgibbon | |
| 7,071,850 B1 | 7/2006 | Fitzgibbon et al. | |
| 7,412,056 B2 | 8/2008 | Farris et al. | |
| 7,477,147 B2 | 1/2009 | Fitzgibbon | |
| 7,492,898 B2 | 2/2009 | Farris et al. | |
| 7,561,075 B2 | 7/2009 | Fitzgibbon et al. | |
| 7,683,794 B2 * | 3/2010 | Contreras | 340/632 |
| 8,368,509 B2 | 2/2013 | Fitzgibbon et al. | |
| 2006/0049914 A1 | 3/2006 | Fitzgibbon | |
| 2007/0005806 A1 | 1/2007 | Fitzgibbon et al. | |
| 2007/0058811 A1 | 3/2007 | Fitzgibbon et al. | |
| 2008/0297370 A1 | 12/2008 | Farris et al. | |
| 2009/0016530 A1 | 1/2009 | Farris et al. | |
| 2009/0021348 A1 | 1/2009 | Farris et al. | |

* cited by examiner

Primary Examiner — Jeffery Hofsass
(74) Attorney, Agent, or Firm — Fitch Even Tabin & Flannery LLP

(57) ABSTRACT

A movable barrier operator controls access to a secured area which houses vehicles. The movable barrier operator is operable to move a movable barrier from an open to a closed position. A sensor controls the operation of a service-providing device through the controller of a movable barrier operator or by direct communication to a controller for the service-providing device. The sensing device senses whether a vehicle is present in the secured area. The sensor is operatively connected to the moveable barrier operator and is used to control the operation of at least one service-providing device without necessarily effecting movement of a barrier by the movable barrier operator. Operation of the service-providing device is effected upon sensing whether a vehicle is present in the secured area to effect an operation of the service-providing device.

31 Claims, 5 Drawing Sheets

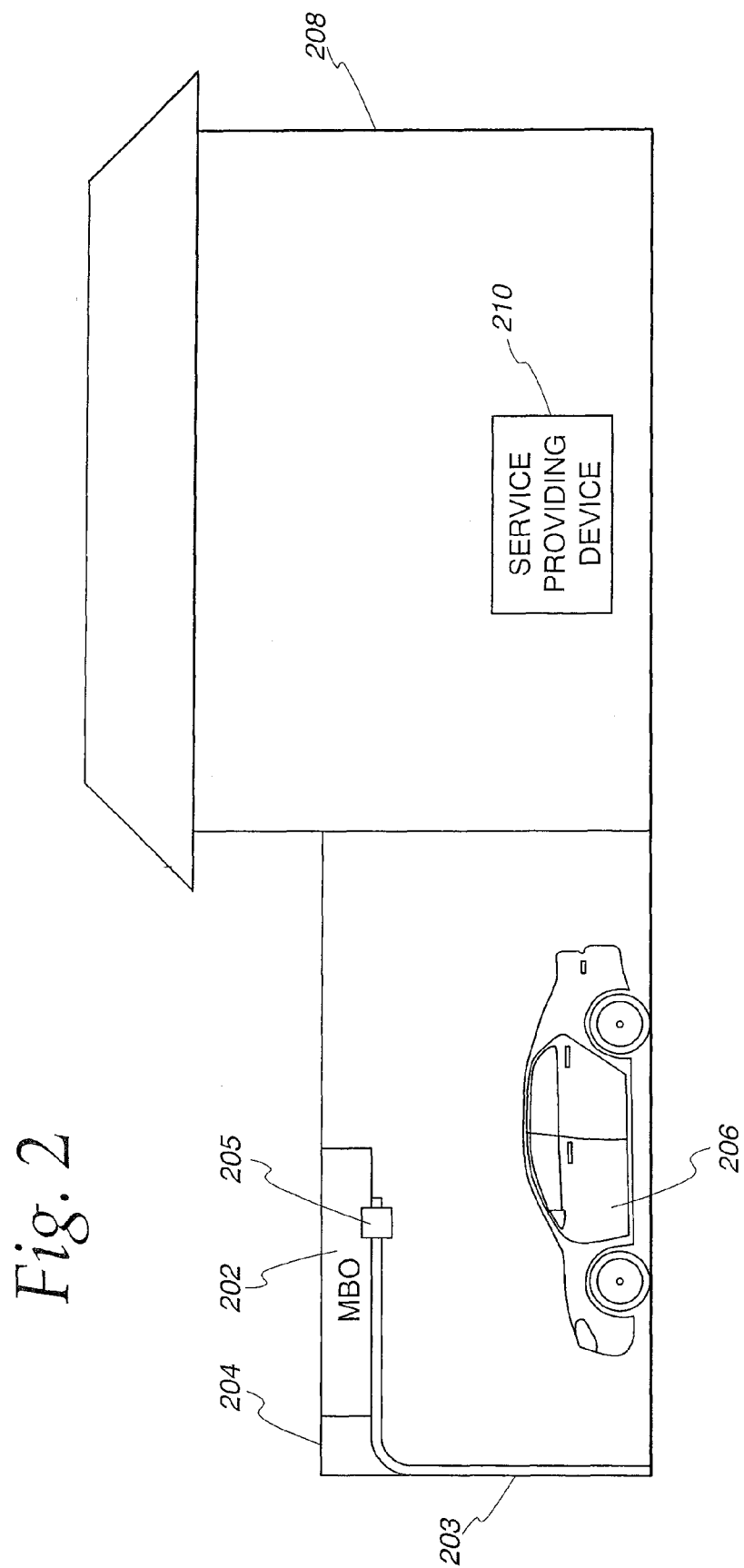

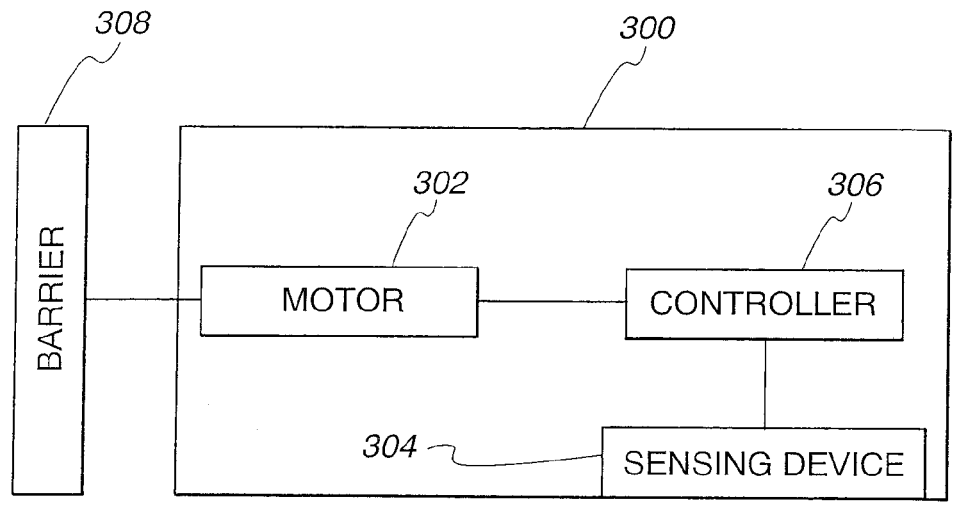
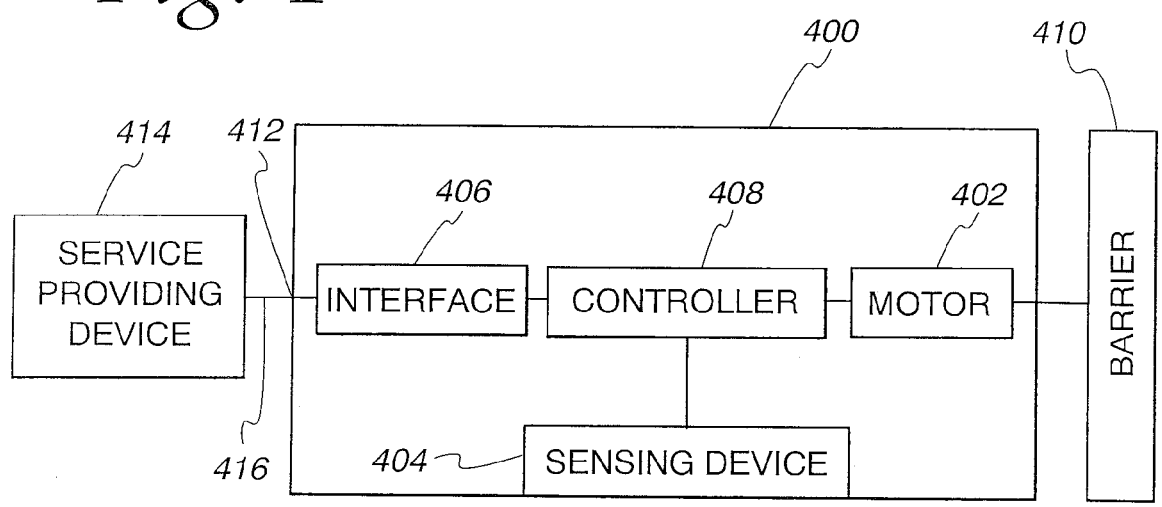

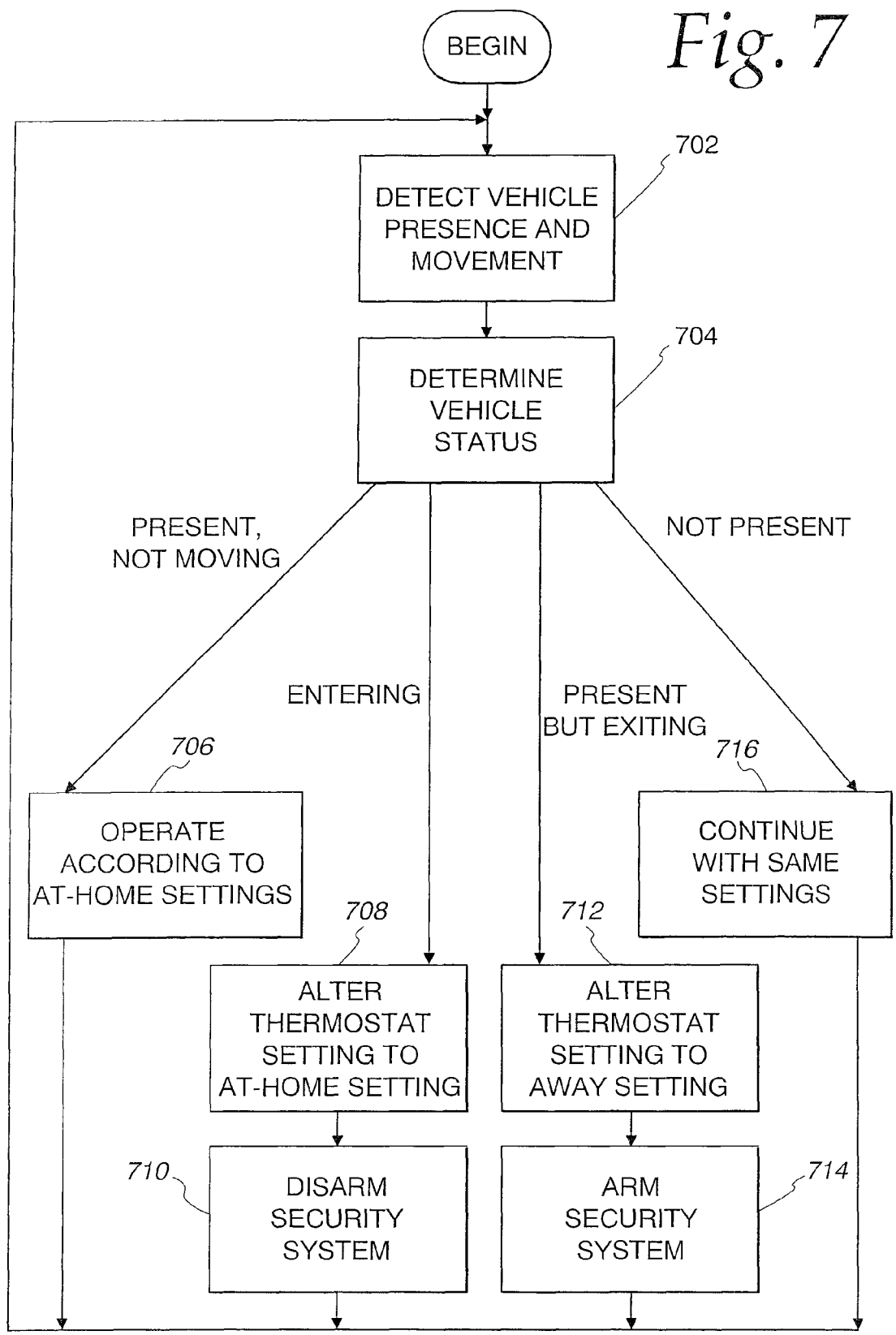

APPARATUS AND METHOD FOR OPERATING DEVICES BASED UPON VEHICLE DETECTION FOR USE WITH A MOVABLE BARRIER

CROSS-REFERENCE TO RELATED APPLICATIONS

This application is a continuation of prior application Ser. No. 12/703,530, filed Feb. 10, 2010, which is hereby incorporated herein by reference in its entirety.

FIELD OF THE INVENTION

The field of the invention relates to the actuation and operation of different types of devices based upon the detection of a vehicle in a particular area.

BACKGROUND

Numerous types of devices and systems are used at today's homes, offices, schools, and businesses. For example, homes include various appliances such as radios, televisions, stereos, stoves, ovens, and refrigerators. In another example, lighting devices (e.g., lamps, area lights and so forth) are used to illuminate various areas of homes, offices or business.

Still other types of devices are employed to control appliances, lights, thermostats alarms, and other devices. For example, a home automation system may operate or otherwise control the lighting devices that are used in a home. A thermostat may control heating devices (e.g., furnaces) and cooling devices (e.g., air conditioners) that affect the temperature of some controlled area of the home. Security systems are deployed to protect areas from intruders. All of the above-mentioned devices and systems consume energy (or control other devices that themselves consume energy) and/or affect the health, comfort, safety, or enjoyment of an area by a user (e.g., the home owner or business owner).

It is often desirable to optimize the operation and reduce the energy consumption of the above-mentioned devices and systems. Economic and/or environmental concerns have to be balanced against the benefits received in operating the device. For example, many homeowners desire to save energy and reduce their energy expenses, but may want to fully use a device at specific times. To take a specific example, it is often not desirable to operate many lighting devices at full power when there is no one at home. In another example, homeowners often want to control their home thermostat to conserve energy when they are away from home. In the summer, homeowners may wish to have the thermostat temperature controlled to permit a temperature to go higher when they are not at home. Conversely, in the winter homeowners may wish to permit a room temperature to go lower through a lower thermostat setting when they are away from home.

Some previous approaches have attempted to conserve energy usage in homes, businesses, and other locations. For example, home automation systems have been developed that control appliances and attempt to reduce unnecessary energy usage. Unfortunately, many of these previous approaches are not flexible in their implementation or operation. For instance, previous lighting control systems can typically turn lights on or off only at predetermined times.

It is also often desirable to automatically operate devices and systems in the home without manual intervention. Manual approaches have been attempted where users manually change the operation of devices under their control, but these manual approaches are burdensome to implement. Some automatic approaches have also been used, but these approaches cannot determine when a homeowner or other occupant is truly on-site, thereby leading to inappropriate decisions as to device or system operation.

Additionally it is desirable to operate devices and systems according to whether an occupier is truly present in an area (e.g., a homeowner or some other person). If these devices are not operated properly, undesirable consequences may occur. For example, in garage door systems that employ a "timer-to-close" feature, the door may close automatically after having been opened. This is not desirable when a home owner, for instance, takes out the trash, stays outside longer than the time to close and is locked out of his home. Previous systems do not have a way of distinguishing as to whether a homeowner has left home or intends to immediately return.

Because of the above-mentioned problems concerning previous approaches, energy continues to be wasted, higher energy expenses continue to be incurred, undesirable operation of home systems sometimes occurs, and general user frustration and inconvenience is frequently created.

SUMMARY

A method and apparatus which includes a movable barrier operator are described herein where a sensor detects the presence of a vehicle within a secured area secured by a barrier, and as a result of whether the vehicle is detected, at least one service-providing device effects an action other than the moveable barrier operator moving the barrier. The sensor, which detects the presence of vehicles, is operably connected to a moveable barrier operator controller which is also in the secured area and is configured to control a service-providing device through the moveable barrier operator controller which controls the moveable barrier operator or a separate service-providing device controller which controls the service-providing device.

The moveable barrier operator is in the secured area and includes a motor, which moves the barrier between an open and closed position, a moveable barrier operator controller which controls the moveable barrier operator and movement of the barrier. The moveable barrier operator controller is operatively coupled to the sensing device which senses whether a vehicle is present within the secured area. According to the method described herein, upon sensing whether a vehicle is present in the secured area, such as a garage, the service-providing device is activated to effect at least one operation of that device without moving the barrier, or prohibit movement of the barrier which can be a garage door. The sensor may be configured to be operably connected to a controller for the moveable barrier operator which in turn is connected to an interface which operably connects the controller of the moveable barrier operator with the controller of the service-providing device. In an important aspect, the interface between the movable barrier operator controller and the controller in the service-providing device is a wireless connection (e.g., RF, microwave, infrared). Alternatively, the sensor may be configured to be operably connected to the controller for the moveable barrier operator and a controller for the service-providing device. In any event, the sensor is configured to effect an operation of the moveable barrier operator and the service-providing device with control of the service-providing device not requiring movement of the barrier. In another aspect, the sensor within the secured area may be activated to sense as a result of the activation of the moveable barrier operator. In this aspect, the controller can activate the sensor to effect an operation or function once the moveable barrier operator is activated.

In one aspect, based upon whether the sensor senses a vehicle in the secured area, one or more service-providing devices peripheral to the movable barrier operator and movement of the barrier, such as security systems, home automation systems and/or thermostats, may be adjusted or otherwise controlled through effecting an action based upon whether a vehicle is present in the secured area. In the case of a thermostat, the temperature of the thermostat can be lowered (in winter) when it is determined that a homeowner is leaving his home via his vehicle thereby producing energy savings for the homeowner. If the service-providing device is a home security system, the security system can be automatically armed with little or no intervention required from the homeowner when the sensor determines that a vehicle has left the secured area. If the service-providing device is a home automation system, at least one operation of the home automation system (e.g., activating a light) may be set or adjusted by the determination of the sensor of whether a vehicle is present in the secured area. As discussed herein, a home automation system is a system that controls the activation of service-providing devices in the home. The home automation system may be a controller or control board or computer that itself is coupled to lights, thermostats, and other devices which are peripheral to the moveable barrier operator and barrier moved by the motor of that operator. The home automation system may independently control other devices and the method and apparatus described herein may supplement and/or override operation of the home automation system. In this aspect the sensor is coupled to the moveable barrier operator controller and effects an action through that controller or a separate controller for the service-providing device to effect an action of the service-providing device without necessarily moving the barrier which is moved by the moveable barrier operator. The approaches described herein allow one person to leave the garage in a vehicle leaving another person and vehicle behind. In this situation if the service-providing device is an alarm, the alarm is not set and the barrier may not be moved by the moveable barrier operator.

In another aspect, many moveable barrier operators have a "timer to close feature" where the barrier will close after a selected period of time. In this situation, if a person uses the timer to close feature and opens the barrier, such as a garage door, then with the method and apparatus described herein, the sensor when configured to effect an operation of the moveable barrier operator will activate a control device of the operator which prohibits the operator from moving or closing the barrier and "locking" the user from a garage or residence if a vehicle is present (or a change in the presence) in the secured area. In other words, the sensor is operatively connected to the controller of the moveable barrier operator and operation of the "timer to close" feature is overridden.

Sensing as described herein may be accomplished with a sensor that is disposed in integral relationship with the movable barrier operator (e.g., housed together with or attached to the movable barrier operator). The sensor can be used to determine various movements of the vehicle within the secured space. For example, the sensor may sense a vehicle entering the secured area. In another example, the exiting of the vehicle from the secured area may also be detected by the sensor.

The movable barrier operator apparatus as described herein includes a motor connected to the barrier and is operable to move a movable barrier from an open position to a closed position, a barrier that controls access to a secured area which houses vehicles, a sensing device that is operably connected to the moveable barrier operator and is configured to sense whether a vehicle is present in the secured area upon activation of the movable barrier operator to move the moveable barrier, and a controller coupled to the sensing device and to the motor. In this aspect the moveable barrier operator controller is configured to communicate through an interface with a service-providing control device which controls the operation of a service-providing device when the movable barrier operator controller receives a signal from the sensor which senses whether a vehicle is present in the secured area to effect an operation of the service-providing device. The moveable barrier operator controller is configured to selectively actuate the motor to move the movable barrier and receives the first signal from the sensor indicative of the presence of the vehicle in the secured area. The operator controller also effects a second signal for transmission at the output of the interface of the moveable barrier operator where the second signal is operative to alter at least one operational parameter of the at least one service-providing device which is peripheral to the movable barrier operator, the peripheral device being a device that controls a function which is outside an area which houses the vehicle.

In one aspect, the sensor and its signal to the barrier operator controller will not effect movement of the barrier. In yet another aspect, the sensor is directly and operatively connected to the controller of the service-providing device as well as to the operator controller. In this aspect as well as in the alternatives described above, the moveable barrier operator also may include an interface having an output communicatively coupled to the at least one service-providing device and the sensor.

In a further aspect, a movable barrier operator positioned in and controlling access to a secured area includes a motor for moving a movable barrier operator, a sensor where the sensor is in integral relationship with the movable barrier operator and senses a presence of a vehicle proximate to the sensor in the secured area and forms a first signal indicative of the presence. In this respect, the term "integral" may include where the sensor is disposed inside a housing unit of the operator or mounted on that housing, or that the sensor is disposed outside the housing unit of the movable barrier operator but connected to the movable barrier operator.

BRIEF DESCRIPTION OF THE DRAWINGS

FIG. 2 comprises a block diagram of a system for operating one or more service-providing devices based upon vehicle presence in a secure area according to various embodiments the present invention;

FIG. 3 comprises a block diagram of movable barrier apparatus according to various embodiments of the present invention;

FIG. 4 comprises a block diagram of a movable barrier operator according to various embodiments of the present invention;

FIG. 7 comprises a flowchart showing one approach for operating one or more service-providing devices based upon vehicle presence in a secure area according to various embodiments the present invention.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. It will further be appreciated that certain actions and/or steps may be described or depicted in a particular order of occurrence while those skilled in the art will understand that such specificity with respect to sequence is not actually required. It will also be understood that the terms and expressions used herein have the ordinary meaning as is accorded to such terms and expressions with respect to their corresponding respective areas of inquiry and study except where specific meanings have otherwise been set forth herein.

DESCRIPTION

Figure 1:
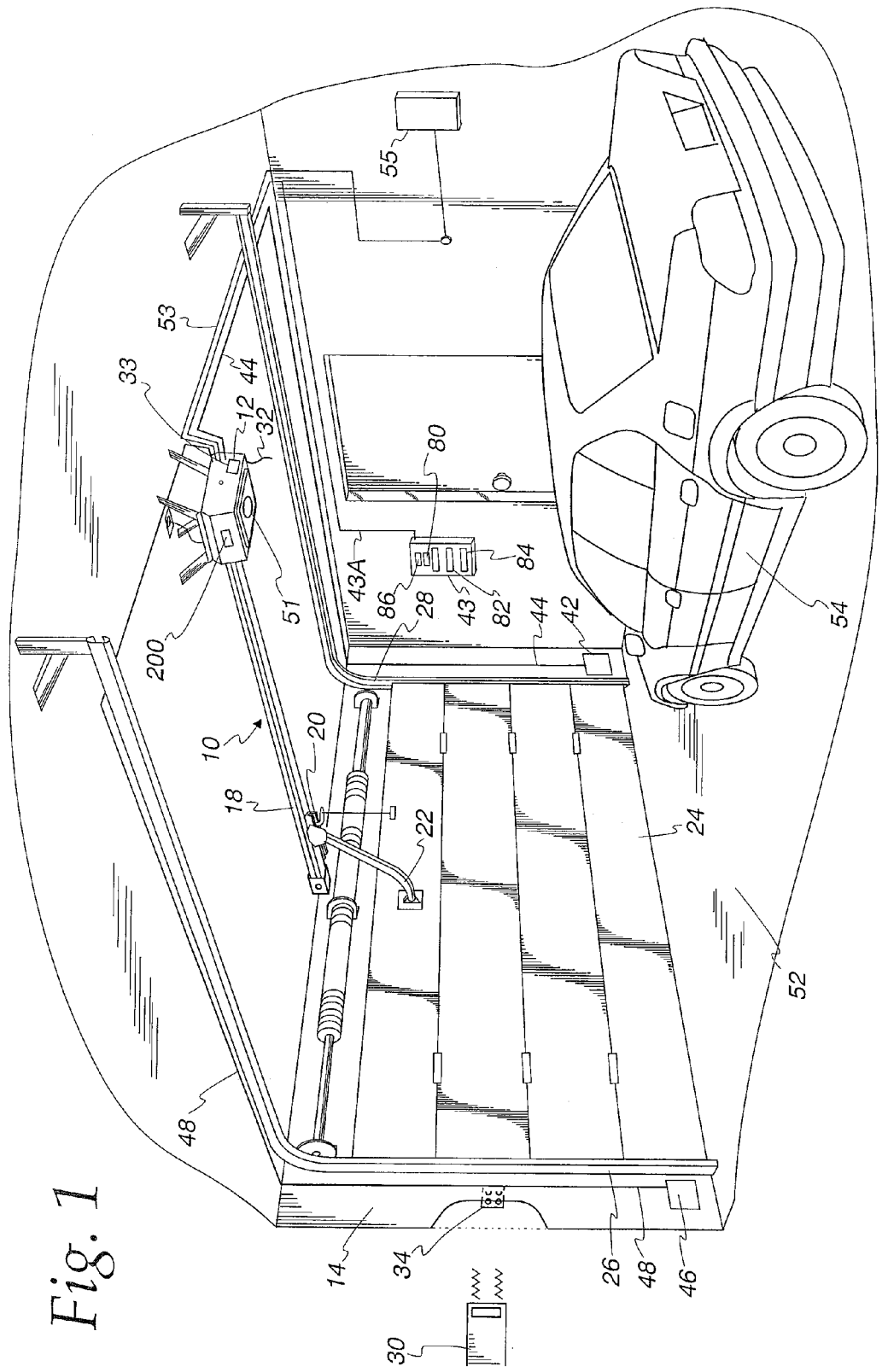
FIG. 1 comprises a diagram of a system for operating one or more service-providing devices based upon vehicle presence in a secure area according to various embodiments the present invention.

Referring now to the drawings and especially to FIG. 1, a movable barrier operator, which in this example is a garage door operator, is generally shown therein and includes a head unit 12 mounted within a garage 14. More specifically, the head unit 12 is mounted to the ceiling of the garage 14 and includes a rail 18 extending therefrom with a releasable trolley 20 attached having an arm 22 extending to a multiple paneled garage door 24 positioned for movement along a pair of door rails 26 and 28. The system includes a hand-held transmitter unit 30 adapted to send signals to an antenna 32 positioned on the head unit 12 as will appear hereinafter. An external control pad 34 is positioned on the outside of the garage having a plurality of buttons thereon and communicates via radio frequency transmission with the antenna 32 of the head unit 12. An optical emitter 42 is connected via a power and signal line 44 to the head unit. An optical detector 46 is connected via a wire 48 to the head unit 12. The head unit 12 also includes a receiver unit 33. The receiver unit 33 receives a wireless signal, which is used to actuate the garage door opener. The emitter 42 and detector 46 may be used to determine that a vehicle 54 is entering or exiting the garage and/or to detect obstructions in the pathway of the barrier 24.

The head unit 12 has the wall control panel 43 connected to it via a wire or line 43A. The wall control panel 43 includes a decoder, which decodes closures of a lock switch 80, a learn switch 82 and a command switch 84 in the wall circuit. The wall control panel 43 also includes a light emitting diode 86 connected by a resistor to the line 43 and to ground to indicate that the wall control panel 43 is energized by the head unit 12. Switch closures are decoded by the decoder, which sends signals along lines 43A to a controller 21 coupled via control lines to an electric motor positioned within the head unit 12. In other embodiments, analog signals may be exchanged between wall control 43 and head unit 12.

The wall control panel 43 is placed in a position such that an operator can observe the garage door 24. In this respect, the control panel 43 may be in a fixed position. However, it may also be moveable as well. The wall control panel 43 may also use a wirelessly coupled connection to the head unit 12 instead of the wire 43A.

The sensor 51 is coupled to the outside of the housing of the head unit 12 and senses the presence of the vehicle 54. The sensor 51 is communicatively coupled to the controller 21 and may also be coupled to a service-providing device 55. In other example, the sensor 51 may be positioned at other locations as in the floor 52. The controller 21 is coupled is coupled to a service-providing device 55 via wired communication line 53. Alternatively, the communication line 53 may be a wireless connection (e.g., an RF connection).

Referring now to FIG. 2, one example of system for operating service-providing devices based upon vehicle detection is described. A moveable barrier operator 202 actuates (e.g., moves) a barrier 203. The movable barrier operator 202 is disposed within a secured area 204 as is a vehicle 206. A service-providing device 210 is disposed in a building 208. (e.g., a home, business or school) Although shown as a single device, the service-providing device 210 may be any number of devices. The service-providing device 210 may be a thermostat control, a security system control, and a home automation system control. Other examples of service-providing devices are possible. The term "service-providing device" as used herein refers to a device or system that directly provides services or actions to a user (e.g., a television, radio, or stereo) or controls devices that provide services (e.g., a thermostat, alarm system or home automation system).

The movable barrier operator 202 may be any type of movable barrier operator such as a garage door operator that operates or is configured to move any type of barrier. The barrier 203 may be any type of barrier such as a garage door, a swinging door, a sliding door, a sliding gate, a swinging gate, or shutters to mention a few examples. Other examples of movable barrier operators and movable barriers are possible.

The movable barrier operator 202 is communicatively coupled to the service-providing device 210. The coupling may be made via any type of communication link (e.g., wired or wireless) that employs any type of communication protocol or technology. In addition, the movable barrier operator 202 may include a controller (e.g., a microprocessor, memory, and/or other control circuitry) that utilizes any combination of programmed software and/or hardware to execute or implement any of the approaches or functions described herein.

The secured area 204 may be any type of area (used for any purpose and of any size, shape, or configuration) that is secured by and has its access controlled by the barrier 203. The secured area 204 is large enough to house at least the vehicle 206 and potentially other vehicles. In the example of FIG. 2, the secured area is a garage. In other examples, the secured area may be a parking lot. Other examples of secured areas are also possible.

The vehicle 206 may be any type of motorized or non-motorized transport mechanism that is used to transport one or more persons. In this respect, the vehicle 206 may be a car, truck, van, boat, motorcycle, or bicycle to name a few examples. Other examples of vehicles are possible.

The movable barrier operator 202 controls the operation of the service-providing device 210 and thereby controls access to the secured area 204 which can house the vehicle 206. The movable barrier operator 202 moves the movable barrier 203 from an open to a closed position (and vice versa) and the movable barrier operator 202 (and a controller in the operator 202) is operatively connected to a sensing device 205 (or incorporates the sensing device 205). The connection from the movable barrier operator 202 to the sensing device 205 may be in the form of a wired or wireless connection that operates according to any communication protocol.

The sensing device 205 is any type of sensor or sensor arrangement that is capable of determining the presence of the vehicle 206 in the secured area 204. In this respect, the sensing device or sensor 205 may be a light sensor, an inductive sensor, a capacitive sensor, or an ultrasonic sensor to mention a few examples. The sensing device 205 depending upon its nature, may be disposed at any location in, around, above, or under the secured area 205. For example, the sensing device 205 may be a light sensor coupled to the ceiling or an inductive sensor buried in the floor. The sensing device 205 may sense the presence of a vehicle across the whole secured area 204 or only parts of the secured area 204 (e.g., within certain parking bays in a garage).

The sensing device 205 senses whether a vehicle is present in (or absent from) the secured area 204 and, in some examples, senses a change in the presence (e.g., the entering or exiting of the vehicle 206 in to or out of the secured area 204). The sensing device 205 directly or indirectly activates the operation of the service-providing device 210 upon sensing whether a vehicle 206 is present in the secured area 204 in order to effect an operation of the service-providing device 210. In this respect and to take one example, the movable barrier operator 202 receives a signal from the sensing device 205 and determines whether a vehicle is present. In another example, the sensed readings are supplied directly to the service-providing device 210 and are directly used to actuate this device. It will be appreciated that other functions may also be provided by the sensing device 205 such as obstacle detection to mention one example.

Although one vehicle 206 is shown, it will be appreciated that more than one vehicle may be present in the secured area 204. Multiple sensing devices may also be used. For example, different sensing devices may be deployed at different bays in a garage. In another example, one sensing device may be positioned at the operator (e.g., above the vehicles) while other sensing devices are deployed at the barrier opening (to determine whether a vehicle is entering or exiting).

The sensing device 205 may sense a parameter that is itself not directly (but indirectly) indicative as to whether or not a vehicle is present in (or absent from) the secured area 204. To take one example, the sensing device 205 may sense whether a vehicle is present based upon an action of the moveable barrier operator and/or the movement of the moveable barrier 203. More specifically, if a vehicle has previously been determined to be present and the sensing device determines the barrier 203 is being opened a determination can be made that the vehicle is exiting the garage.

As mentioned, the sensing device 205 may determine if the vehicle 206 is entering the secured area 204 or exiting the secured area 204. Additional actions may be undertaken by the system based upon this determination. For instance, if the vehicle is exiting the secured area 204, a timer may be started and after the timer expires, the movable barrier 203 may be moved (e.g., closed).

When the service-providing device 210 is actuated by the movable barrier operator 202 (or directly from the readings of the sensing device 205), a wide variety of actions may be performed depending upon the nature of the service-providing device. For example, the temperature of a thermostat may be adjusted based upon whether the vehicle 206 is sensed in the secured area 204. In another example, one or more parameters of a component of a home-based automation system are adjusted based upon whether the vehicle 206 is sensed as being in the secured area 204. In still another example, one or more security parameters of a security system are adjusted.

The approaches described herein also may prevent unintended, harmful, or the otherwise undesirable operation of the movable barrier 203. In one particular example, the automatic closing of the movable barrier 203 may be prevented when the sensing device 205 detects the presence of the vehicle 206. In one specific example of this approach, when a homeowner opens their garage door to take out the trash, the approaches described herein may determine that the homeowner has not left in their vehicle and prevent any automatic closing of the garage door that would normally have taken place using a timer-to-close function. In other words, the approaches described herein override an operational feature of the operator 202 (or the service-providing device 210) to prevent the barrier 203 from being closed in some circumstances.

The approaches described herein also allow one person to leave the secured area 204 (e.g., their garage) in their vehicle and leave another person behind. In this situation, the service-providing device 210 is properly operated and the system is not fooled into believing that no one is at home. In one example, an alarm is not set (that would normally be set if no one were at home) and the timer-to-close feature (that would automatically close the barrier) is disabled. The determination that a person is at home may be made in a variety of different ways. For example, this determination may be made by sensing that another vehicle is still present in the secured area 204 or that only one person left in the vehicle 206 (knowing that two people were originally at home).

The determination that a person or persons are originally in the house may be made by any sensor arrangement (e.g., a passive infrared (PIR) sensor) that senses and determines that the number of persons present in the house. In one example, various sensors may be located in various positions or locations in the house (e.g., in different rooms). These sensors sense the activities (or presence) of persons in the house and a determination (i.e., count) is made as to an original number of persons present in the house from these sensed readings. In other examples, the initial number of occupants can be set manually and then this number can be adjusted automatically as persons enter and leave the house (e.g., as indicated by sensors). In still other examples, persons in the house can manually indicate when they are leaving the house in a vehicle and this can be subtracted from the original count.

Similarly, sensors may be positioned (e.g., near or across the doorways of vehicles) to detect the number of persons leaving in a vehicle. For instance, these sensors may be position directly across from the doors of a vehicle (or, in another example, in the vehicle itself) to count the number of persons entering the vehicle. Other examples of approaches are possible to sense the original number of occupants of a house and the number leaving in a vehicle.

As mentioned, based upon whether the vehicle 206 is sensed as being located in the secured area 204, one or more service-providing devices 210, such as security systems, home automation systems and/or thermostats, may be adjusted or otherwise controlled based upon whether a vehicle is present in the secured area 204. If the device 210 is a thermostat, the temperature of the thermostat can be lowered (e.g., during winter) when it is determined that a homeowner is leaving his home via his vehicle thereby producing energy savings for the homeowner. If the service-providing device 210 is a home security system, the security system can be automatically armed with little or no intervention required from the homeowner when the sensor determines that a vehicle has left the secured area. If the service-providing device 210 is a home automation system, one or more operations of the home automation system (e.g., activating a light) may be set or adjusted by the determination of the sensor of whether a vehicle 206 is present in the secured area 204. The home automation system may be a controller or control board that itself is coupled to lights, thermostats, and so forth. The home automation system may independently control other devices and the method and apparatus described herein may supplement and/or override operation of the home automation system.

Referring now to FIG. 3, a movable barrier operator apparatus 300 includes a motor 302, a sensing device 304, and a controller 306. The motor 302 is operable to move a movable barrier 308 from an open position to a closed position (and vice versa). The barrier 308 controls access to a secured area (e.g., a garage) which houses one or more vehicles. The sensing device 304 is configured to sense whether a vehicle (or vehicles) is present in the secured area.

The controller 306 is coupled to the motor 302 and the sensing device 304. The controller 306 is configured to activate a service-providing device 310 based upon sensing whether a vehicle is present in the secured area and to effect an operation of the service-providing device 310. The service-providing device 310 does not effect movement of the barrier 308.

The motor 302 is any type of motor capable of moving a movable barrier. The sensing device 304 is configured to sense whether a vehicle is present in the secured area upon activation of the movable barrier operator 300 and move the moveable barrier 308. The sensing device 304 is also configured to determine a presence of a vehicle that is entering or exiting the secured area. The sensing device 304 may be any number or types of devices or sensing arrangements. For instance, the sensing device 304 may be a light sensor, an inductive sensor, a capacitive sensor, or an ultrasonic sensor.

Additionally, it will be appreciated that any number of sensing devices may be used. Some sensing devices may sense the presence of the vehicle, others may sense movement of the vehicle, and still others may sense the number of persons in a vehicle.

The service-providing device 310 may also be a variety of different devices. For example, the service-providing device 310 may include, but is not limited to, a thermostat control, a security system control, and a home automation system control. Additionally, although one service-providing device shown in this example, any number of service-providing devices may be deployed.

In one example of the operation of the apparatus 300, when the service-providing device 310 is a thermostat, the controller 306 may adjust the temperature of the thermostat based upon whether a vehicle is sensed in the secured area. In another example, when the service-providing device 310 is a home-based automation system, the controller 306 may activate the operation of the home-based automation system (e.g., to control the lights) based upon whether a vehicle is sensed as being in the secured area. In still another example, when the service-providing device 310 is a security system, the controller 306 may adjust a security parameter of the security system.

In another example of the operation of the apparatus 300, the controller 306 is configured to start a timer after sensing that the vehicle has exited the secured area. After the timer expires, the controller 306 causes actuation of the movable barrier such as closing the movable barrier. The controller 306 may also be configured to prevent an automatic closing of the movable barrier 308 when the sensing device detects the presence of a vehicle. The timer value may vary but is sufficient to allow the vehicle to enter or exit the secured area. In one example, the timer value is one minute.

The sensing device 304 may be disposed in integral relationship with the movable barrier operator 300, sense a presence of a vehicle proximate to the sensing device 304 in the secured area, and form a first signal indicative of the presence. In this respect, the term "integral" includes configurations and arrangements where the sensor is disposed inside the outer housing of the movable barrier operator, mounted on a housing of the operator, partially inside and outside this housing, or completely external to the housing (but connected to the movable barrier operator by a wired or wireless connection).

Referring now to FIG. 4, a movable barrier operator 400 is positioned in and controls access to a secured area (e.g., a garage). The operator 400 includes a motor 402, a sensor 404, an interface 406, and a controller 408. The motor 402 is configured to move a movable barrier 410 and is any type of motor capable of moving a moveable barrier.

The sensor 404 is disposed in integral relationship with the movable barrier operator 400. In this respect, the sensor 404 may be disposed completely inside the housing of the movable barrier operator, mounted on a housing of the operator, partially inside and partially outside the external housing of the movable barrier operator 400, or totally outside the outer housing of the movable barrier operator 400 (but connected to the movable barrier operator 400 via a wired or wireless connection).

The sensor 404 is configured to sense the presence (or absence) of a vehicle proximate to the sensor 404 in the secured area and to form a first signal indicative of the presence. The sensor 404 may be a wide variety of devices. For example, the sensor 404 may be a device such as a light sensor, an inductive sensor, a capacitive sensor, and an ultrasonic sensor. Other examples of sensors are possible. Additionally, it will be appreciated that any number of sensors may be used and communicate with the controller 408 via the interface 406.

The interface 406 has an output 412. The output 412 is communicatively coupled to at least one service-providing device 414 with communication link 416. The communication link 416 may be any wired or wireless connection (e.g., an RF wireless connection). The interface 406 is any combination of computer hardware or programmed computer software that provides connections to the one or more service-providing devices 414.

The controller 408 is coupled to the motor 402, the sensor 404, and the interface 406. The controller 408 is configured to selectively actuate the motor 408 to move the movable barrier 410. The controller 408 is also configured to receive the first signal from the sensor 404 indicative of the presence of the vehicle in the secured area. The controller 408 is further configured to form a second signal for transmission at the output of the interface 406. The second signal is operative to alter at least one operational parameter of the service-providing device 414. The controller 408 may be also configured to prevent an automatic closing of the movable barrier when the first signal indicates the presence of a vehicle.

The service-providing device 414 may be a variety of different devices. For example, the service-providing device 414 may be a thermostat, a security system, and a home automation system. Other examples are possible. Additionally, although only a single service-providing device 414 is shown it will be appreciated that any number of service-providing devices may be deployed.

In one example of the operation of the operator of FIG. 4, the service-providing device 414 is a thermostat and the controller 408 is configured to adjust the temperature of the thermostat based upon whether a vehicle is present in the secured area. In another example, the service-providing device 414 is a home automation system and the controller 408 is configured to set one or more operating parameters (e.g., temperatures, sound levels, light levels, and so forth) of a component of the home automation system based upon whether a vehicle is present in the secured area. In another example, the service-providing device 414 is a security system and the controller 408 is configured to set at least one security-related parameter of the security system based upon whether a vehicle is present in the secured area. In another example, the controller 408 is further configured to activate a timer after sensing that the vehicle has exited the secured area. After the timer expires, the motor 402 is actuated by the controller 408 to move the movable barrier 410.

Figure 5:
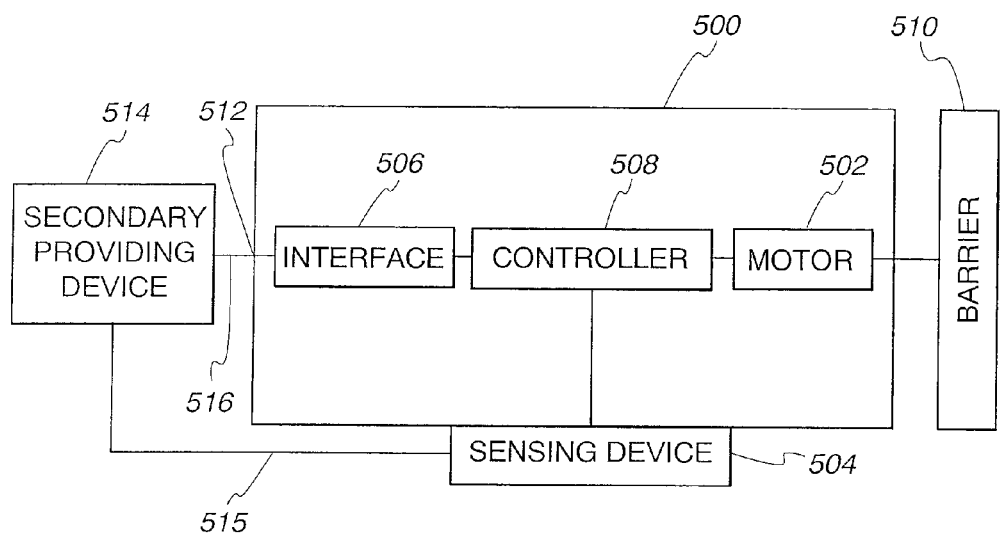
FIG. 5 comprises a block diagram of a movable barrier operator according to various embodiments of the present invention.

Referring now to FIG. 5, a movable barrier operator 500 is positioned in and controls access to a secured area (e.g., a garage). The operator 500 includes a motor 502, a sensor 504, an interface 506, and a controller 508. The motor 502 is configured to move a movable barrier 510 and is any type of motor capable of moving a moveable barrier.

The sensor 504 is disposed in integral relationship with the movable barrier operator 500. In this respect, the sensor 504 may be disposed completely inside the housing of the movable barrier operator, mounted on a housing of the operator, partially inside and partially outside the external housing of the movable barrier operator 500, or totally outside the outer housing of the movable barrier operator 500 (but connected to the movable barrier operator 500 via a wired or wireless connection).

The sensor 504 is configured to sense the presence (or absence) of a vehicle proximate to the sensor 504 in the secured area and to form a first signal indicative of the presence. The sensor 504 may be a wide variety of devices. For example, the sensor 504 may be a device such as a light sensor, an inductive sensor, a capacitive sensor, and an ultrasonic sensor. Other examples of sensors are possible. Additionally, it will be appreciated that any number of sensors may be used and communicate with the controller 508 via the interface 506. The sensor is additionally directly coupled to a service-providing device via a connection 515. The connection 515 may be wired or wireless.

The interface 506 has an output 512. The output 512 is communicatively coupled to the one service-providing device 514 via a connection 516. The connection 516 may be any wired or wireless connection (e.g., an RF wireless connection). The interface 506 is any combination of computer hardware or programmed computer software that provides connections to the one or more service-providing devices 514.

The controller 508 is coupled to the motor 502, the sensor 504, and the interface 506. The controller 508 is configured to selectively actuate the motor 502 to move the movable barrier 510. The controller 508 is also configured to receive the first signal from the sensor 504 indicative of the presence of the vehicle in the secured area. The controller 508 is further configured to form a second signal for transmission at the output of the interface 506. The second signal is operative to alter at least one operational parameter of the service-providing device 514. The controller 508 may be also configured to prevent an automatic closing of the movable barrier when the first signal indicates the presence of a vehicle.

The service-providing device 514 may be a variety of different devices. For example, the service-providing device 514 may be a thermostat, a security system, and a home automation system. Other examples are possible. Additionally, although only a single service-providing device 514 is shown it will be appreciated that any number of service-providing devices may be deployed.

In one example of the operation of the operator of FIG. 5, the service-providing device 514 is a thermostat and the controller 508 is configured to adjust the temperature of the thermostat based upon whether a vehicle is present in the secured area. In another example, the service-providing device 514 is a home automation system and the controller 508 is configured to set one or more operating parameters (e.g., temperatures, sound levels, light levels, and so forth) of a component of the home automation system based upon whether a vehicle is present in the secured area. In another example, the service-providing device 514 is a security system and the controller 508 is configured to set at least one security-related parameter of the security system based upon whether a vehicle is present in the secured area. In another example, the controller 508 is further configured to activate a timer after sensing that the vehicle has exited the secured area. After the timer expires, the motor 502 is actuated by the controller 508 to move the movable barrier 510.

As mentioned, the sensor 504 may transmit signals directly to the service-providing device 514. In another example of the operation of the system of FIG. 5, the sensor 504 may transmit signals directly to the service-providing device 514 that are operable to operate the service providing device 514. At the same time (or at other times) the sensor 504 may supply sensed readings to the controller 502 that can operate the operator 500 (e.g., cause the operator to open or close the barrier).

Figure 6:
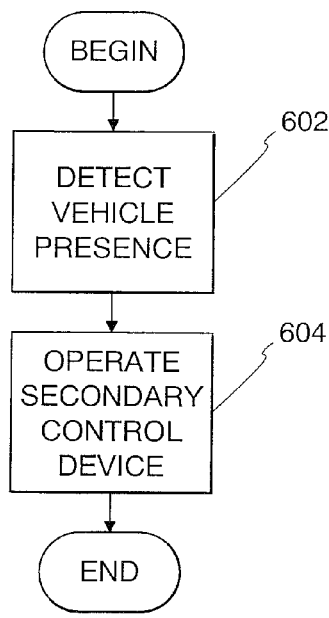
FIG. 6 comprises a flowchart showing one approach for operating one or more service-providing devices based upon vehicle presence in a secure area according to various embodiments the present invention.

Referring now to FIG. 6, one example of an approach for operating a device based upon vehicle presence in (or absence from) a secure area is described. At step 602, a sensor detects the presence of a vehicle in a secured area secured by a barrier.

At step 604, as a result of whether the vehicle is detected, one or more service-providing devices effect an action other than moving the moveable barrier operator the barrier. For example, if the vehicle is absent and the service-providing device is a thermostat, the temperature of the thermostat may be adjusted. Other examples of effecting an action have been described elsewhere herein.

Referring now to FIG. 7, another approach for operating a service-providing device based upon vehicle detection is described. It will be appreciated that the approach of FIG. 7 is one example only of operating a service-providing device and that other approaches can be used. In the example of FIG. 7, a thermostat and home security system are deployed as service-providing devices but other service-providing devices can also be used. Additionally, one or more sensors are used to determine the presence of a vehicle and/or whether the vehicle is entering or exiting the secured area. It will be appreciated that any number sensors may be used, for example, sensors dedicated to determining whether a vehicle is entering or exiting the secured area.

At step 702, the presence of the vehicle and/or movement of the vehicle (e.g., exiting or entering of the vehicle) are sensed and/or determined. To take one example, a sensor arrangement including a light emitter and detector may be deployed at the entrance of the secured area and they act to detect vehicle entry in to or out of the secured area. In this case, the emitter emits a beam of light and the detector receives the beam of light. When the vehicle is known to be in the secured area and a vehicle is detected (e.g., the beam of light is not received in whole or in part), it can be determined that a vehicle is leaving the secured area. On the other hand, if the vehicle is not known to be in the secured area and this sensor is activated, then it can be determined that the vehicle is entering the secured area.

At step 704, based upon the sensed readings, the vehicle status is determined. As mentioned, this status includes the presence of the vehicle and/or movement of the vehicle.

When the determined status shows that vehicle is present in the secured area and is not moving, execution continues at step 706. At step 706 all secondary devices are operated at their settings for when the homeowner is home.

When the determined status is that the vehicle is entering the secured area, then execution continues at step 708. At step 708 the temperature of the thermostat is increased (e.g., if the present season is winter). The temperature may be decreased as well (e.g., the present season is summer). Other factors may also be used to adjust the thermostat. At step 710, the security system is automatically disarmed (with little or no intervention required from the homeowner) when it is determined that a vehicle is entering the secured area.

When the determined status is that the vehicle is exiting the secured area (and no one is left at home), then execution continues at step 712. At step 712 the temperature of the thermostat is lowered (e.g., if the present season is winter) when it is determined that a homeowner is leaving their home via their vehicle thereby producing energy savings for the homeowner. The temperature may be raised as well (e.g., the present season is summer). Other factors may also be used to adjust the thermostat. At step 714, the security system is automatically armed (with little or no intervention required from the homeowner) when it is determined that a vehicle has left the secured area.

When it is determined that the vehicle is not present in the secured area, and not exiting or entering the secured area, step 716 is executed. At step 716, the setting of the thermostat and the security device are not altered.

It will be understood that the actions described above with respect to the particular service-providing devices are examples only and that other actions can be provided depending upon the needs of the user or system. For example, when a vehicle is exiting it may be desirable not to arm the security system when a person has been left at home or it may be desirable to arm the security system when only certain individuals (e.g., children) are left at home.

Thus, approaches are provided that allow the control of secondary devices in a home or other area based upon the presence of a vehicle in a secure area associated with the home or area. The approaches are accurate in determining vehicular presence (and thereby homeowner presence) and result in cost savings for home owners and others. Devices can be operated more efficiently and effectively. Inappropriate operation of these devices and systems can also be prevented from occurring.

Those skilled in the art will recognize that a wide variety of modifications, alterations, and combinations can be made with respect to the above described embodiments without departing from the spirit and scope of the invention, and that such modifications, alterations, and combinations are to be viewed as being within the scope of the invention.

What is claimed is:

1. A method which uses a sensing device for a movable barrier operator to provide a signal to at least one service-providing device, the movable barrier operator configured to move a barrier from an open to a closed position and control access to a secured area which houses vehicles, the method comprising:
   sensing with the sensing device whether a vehicle is present within the secured area, the service-providing device operatively connected to the sensing device; and
   effecting at least one operation of the service-providing device in response to sensing whether a vehicle is present in the secured area where the service-providing device provides a service other than opening or closing the movable barrier.

2. The method of claim 1 wherein more than one vehicle is present in the secured area.

3. The method of claim 1 wherein the sensing comprises sensing a change in presence of the vehicle.

4. The method of claim 1 wherein the sensing device senses whether a vehicle is present upon action of the movable barrier operator to move the movable barrier.

5. The method of claim 1 wherein the at least one service-providing device is selected from the group consisting of a thermostat control, a security system control, and a home automation system control.

6. The method of claim 1 wherein the activating the operation of the service-providing device includes adjusting a temperature of a thermostat based upon whether a vehicle is sensed in the secured area.

7. The method of claim 1 wherein the activating the operation of the service-providing device includes adjusting a parameter of a component of a home-based automation system based upon whether a vehicle is sensed in the secured area.

8. The method of claim 1 wherein activating the operation of the service-providing device includes adjusting the at least one service-providing device comprises adjusting a security parameter of a security system.

9. The method of claim 1 wherein activating the operation of the service-providing device includes the control device selecting an operational parameter from a variety of choices for operation of the service-providing device.

10. The method of claim 1 wherein sensing vehicle presence comprises sensing a vehicle entering the secured area.

11. The method of claim 1 wherein sensing vehicle presence comprises sensing a vehicle exiting the secured area.

12. The method of claim 11 further comprising starting a timer after sensing of the vehicle exiting, and after the timer expires, moving the movable barrier.

13. The method of claim 12 wherein moving the movable barrier comprises closing the movable barrier.

14. The method of claim 1 wherein the sensor is operatively connected to a controller which controls operation of the movable barrier operator and a motor which moves the barrier.

15. The method of claim 1 wherein the sensing device is selected from the group consisting of a light sensor, an inductive sensor, a capacitive sensor, and an ultrasonic sensor.

16. The method of claim 1 further comprising actuating the movable barrier and preventing an automatic closing of the movable barrier when the sensing detects the presence of a vehicle.

17. A method which uses a sensing device for a movable barrier operator to control the operation of at least one service-providing device, the movable barrier operator configured to move a barrier from an open to a closed position and control access to a secured area which houses vehicles, the method comprising:
   sensing with the sensing device whether a vehicle is present within the secured area, the service-providing device operatively connected to the sensing device;
   sending a signal from the sensing device to a controller for the service-providing device, the signal indicating whether a vehicle is present in the secured area; and
   effecting at least one operation of the service-providing device in response to the signal from the sensing device where the service-providing device provides a service other than opening or closing the movable barrier.

18. The method of claim 17 wherein the sensing device comprises a plurality of sensors configured to sense whether a vehicle is present within the secured area.

19. The method of claim 17 wherein the sensing device is configured to detect if the vehicle is present and moving within the secured area.

20. The method of claim 17 further comprising sensing the number of persons within the secured area.

21. The method of claim 17 further comprising prohibiting movement of the movable barrier in response to the signal.

22. The method of claim 17 wherein the signal indicates at least one of a vehicle present in the secured area, a vehicle absent from the secured area, a vehicle entering the secured area and a vehicle exiting the secured area.

23. A movable barrier operator apparatus comprising:
a motor that is operable to move a movable barrier from an open position to a closed position, the barrier controlling access to a secured area which houses vehicles;
a controller coupled to the motor, the controller being configured to effect operation of the motor; and
a sensing device that is configured to sense whether a vehicle is present within the secured area,
at least one of the controller and the sensing device being configured to effect an operation of a service-providing device upon receiving a signal from the sensing device whether a vehicle is present in the secured area, where the service-providing device provides a service other than opening or closing the movable barrier.

24. The apparatus of claim 23 wherein the sensor is directly and operably coupled to the service-providing device.

25. The apparatus of claim 23 wherein the sensor is directly and operably coupled to the controller and the service-providing device.

26. The apparatus of claim 23 wherein the sensing device comprises a plurality of sensors configured to sense whether a vehicle is present within the secured area.

27. The apparatus of claim 23 wherein the sensing device is configured to detect if the vehicle is present and moving within the secured area.

28. The apparatus of claim 23 wherein the sensing device is configured to sense a number of persons within the secured area.

29. The apparatus of claim 23 wherein the sensing device is configured to provide a signal indicating at least one of a vehicle present in the secured area, a vehicle absent from the secured area, a vehicle entering the secured area and a vehicle exiting the secured area.

30. The apparatus of claim 23 wherein the at least one service-providing device is selected from the group consisting of a thermostat control, a security system control, and a home automation system control.

31. The apparatus of claim 23 wherein the sensing device comprises a device selected from the group consisting of a light sensor, an inductive sensor, a capacitive sensor, and an ultrasonic sensor.

* * * * *